(12) United States Patent
Dave

(10) Patent No.: US 8,000,605 B2
(45) Date of Patent: Aug. 16, 2011

(54) SYNCHRONOUS OTDM: GAPPED CLOCK CREATION AND DUTY CYCLE MULTIPLICATION

(75) Inventor: Bharat Dave, Howell, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 1194 days.

(21) Appl. No.: 10/442,876

(22) Filed: May 21, 2003

(65) Prior Publication Data

US 2003/0228150 A1    Dec. 11, 2003

Related U.S. Application Data

(60) Provisional application No. 60/386,353, filed on Jun. 6, 2002.

(51) Int. Cl.
*H04J 14/08* (2006.01)
(52) U.S. Cl. .............................. 398/98; 398/99; 398/52
(58) Field of Classification Search .................... 398/47, 398/52, 53, 75, 77, 98, 102, 99
See application file for complete search history.

(56) References Cited

U.S. PATENT DOCUMENTS

| | | | |
|---|---|---|---|
| 3,995,120 A * | 11/1976 | Pachynski, Jr. | 370/517 |
| 4,170,715 A * | 10/1979 | Mizokawa | 375/292 |
| 4,513,288 A * | 4/1985 | Weathers et al. | 342/201 |
| 4,686,667 A | 8/1987 | Ohnsorge | |
| 4,726,010 A | 2/1988 | Ali et al. | |
| 5,329,393 A | 7/1994 | Huang | |
| 5,631,758 A | 5/1997 | Knox et al. | |
| 5,926,297 A * | 7/1999 | Ishikawa et al. | 398/43 |
| 6,118,564 A | 9/2000 | Ooi et al. | |
| 6,724,994 B1 | 4/2004 | Collings et al. | |
| 6,917,761 B2 * | 7/2005 | Nakamura | 398/98 |
| 6,950,972 B2 * | 9/2005 | Liu et al. | 714/714 |
| 6,961,523 B2 * | 11/2005 | Furuyama | 398/154 |
| 2003/0002797 A1 * | 1/2003 | Chu et al. | 385/39 |
| 2003/0228150 A1 * | 12/2003 | Dave | 398/98 |
| 2008/0170587 A1 * | 7/2008 | Kershteyn | 370/464 |
| 2009/0097854 A1 * | 4/2009 | Futami et al. | 398/98 |

* cited by examiner

*Primary Examiner* — Ken N Vanderpuye
*Assistant Examiner* — Tanya Ngo
(74) *Attorney, Agent, or Firm* — Sorin Royer Cooper LLC

(57) ABSTRACT

Methods and apparatus for implementing synchronous Optical Time Division Multiplexing are presented. Namely, a method of upconverting and combining N input NRZ optical data signals, each having an approximately equal pulse width and period, into one time-division multiplexed output signal, as well as a method for the inverse, i.e., down converting the N demultiplexed component signals are presented. Apparatus to implement these functionalities is also presented.

3 Claims, 15 Drawing Sheets

STATE TABLE

| Feedback | Short Pulse | CW | Output |
|---|---|---|---|
| 0 | 1 | 1 | 1 |
| 1 | 0 | 1 | 1 |
| 1 | 0 | 1 | 1 |
| 1 | 1 | 1 | 0 |
| 0 | 0 | 1 | 0 |
| 0 | 1 | 1 | 1 |
| 1 | 0 | 1 | 1 |
| 1 | 0 | 1 | 1 |
| 1 | 1 | 1 | 0 |
| 0 | 0 | 1 | 0 |
| 0 | 1 | 1 | 1 |
| 1 | 0 | 1 | 1 |
| 1 | 0 | 1 | 1 |
| 1 | 1 | 1 | 0 |
| 0 | 0 | 1 | 0 |
| 0 | 1 | 1 | 1 |
| 1 | 0 | 1 | 1 |
| 1 | 0 | 1 | 1 |
| 1 | 1 | 1 | 0 |
| 0 | 0 | 1 | 0 |

*FIG. 15*

SYNCHRONOUS OTDM: GAPPED CLOCK CREATION AND DUTY CYCLE MULTIPLICATION

CROSS REFERENCE TO OTHER APPLICATIONS

This application claims the benefit of U.S. Provisional Patent Application Ser. No. 60/386,353, filed on Jun. 6, 2002.

TECHNICAL FIELD

Functionalities necessary for an all optical synchronous time domain multiplexing and demultiplexing scheme are presented. In particular, all optical methods for (i) multiplying a clock by an integer N, (ii) introducing gaps in the clock cycle, and (iii) duty cycle multiplication are presented.

BACKGROUND OF THE INVENTION

Time domain multiplexing (TDM) in the optical domain (or "OTDM") is a key enabling technology for the next generation all optical networks. The ability to exploit TDM independently of signal format and bit rate is a crucial step in realizing a completely transparent all optical network. Because an all-optical network in general does not need to "know" the bit rate or signal format of a particular signal it transmits, bit rate and format independent OTDM is a natural fit. What will be addressed herein relates to synchronous OTDM. In order to accomplish synchronous OTDM, N input signals at a given clock rate must be upconverted and interleaved to form a multiplexed output signal. To do this all optically, various clock conversions, modulations and clock gap creations must be accomplished solely in the optical domain, as explained below.

SUMMARY OF THE INVENTION

Methods and apparatus for implementing synchronous Optical Time Division Multiplexing are presented. Namely, a method of upconverting and combining N input NRZ optical data signals, each having an approximately equal pulse width and period, into one time-division multiplexed output signal, as well as a method for the inverse, i.e., down converting the N demultiplexed component signals are presented. Apparatus implementing these methodologies is also presented.

BRIEF DESCRIPTION OF THE DRAWINGS

FIG. 15 depicts a state table of the various inputs and the output of FIG. 14.

DETAILED DESCRIPTION OF THE PREFERRED EMBODIMENTS

Figure 1:
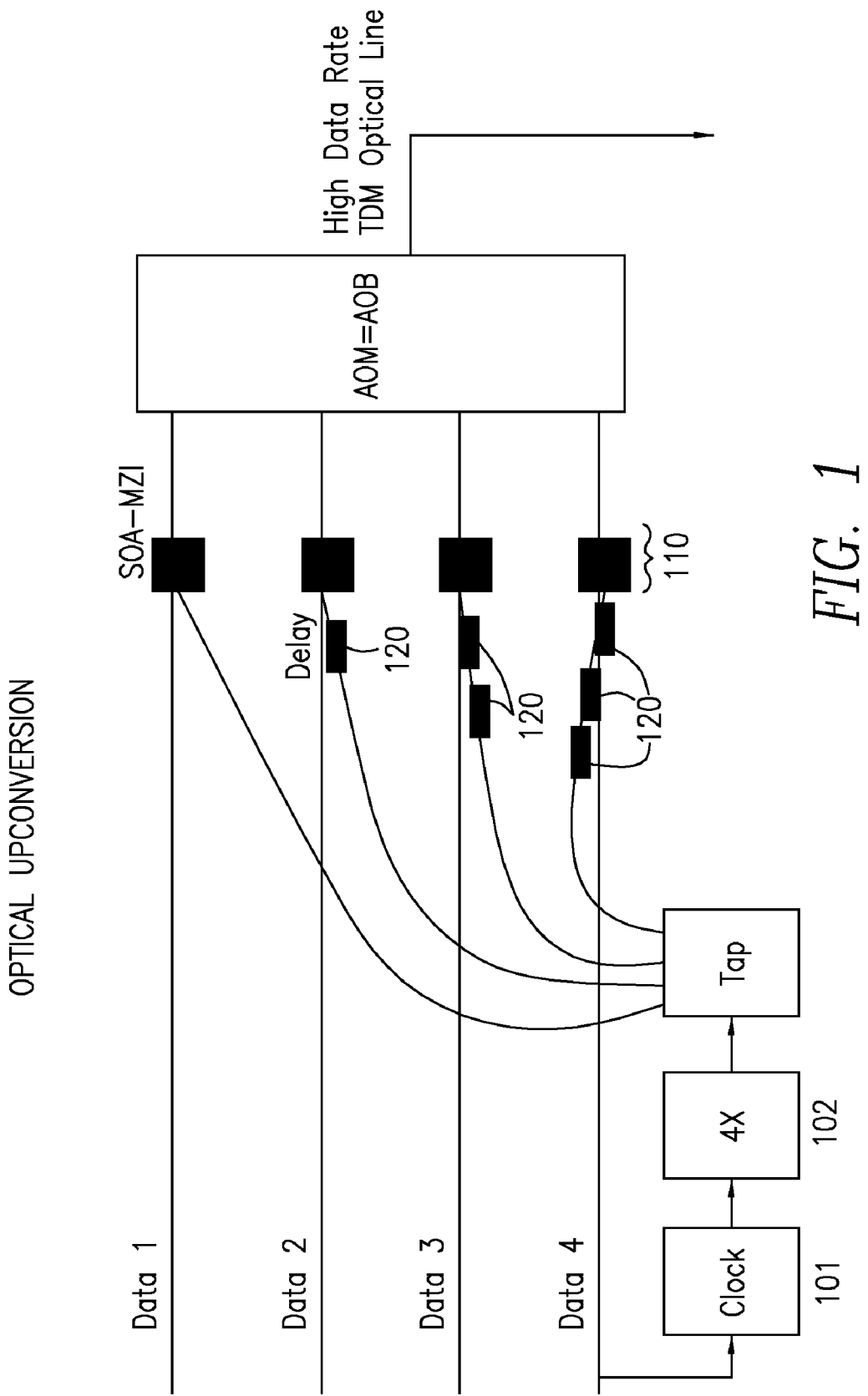
FIG. 1 depicts an exemplary transmit side optical time division multiplexing scheme according to the present invention.

Before one or more embodiments of the invention are explained in detail, it is to be understood that the invention is not limited in its application to the details of construction or the arrangements of components set forth in the following description or illustrated in the drawings (the terms "construction" and "components" being understood in the most general sense and thus referring to and including, in appropriate contexts, methods, algorithms, processes and sub-processes). The invention is capable of other embodiments and of being practiced or being carried out in various ways. Also, it is to be understood that the phraseology and terminology used herein is for the purpose of description and should not be regarded as in any way limiting.

For illustration purposes, instead of speaking wholly in terms of clock rates, the inverse concept of pulse widths will be often be utilized. Pulse widths can be easily visualized, and are related to the bit rate by the relationship Bit Rate=1/Pulse width. Thus, the N input signals of period P and pulse width τ (generally P=2τ for a 50% duty cycle) must be processed such that their pulse width is decreased by a factor of 1/N, to τ/N, while their period is retained at P, thus decreasing their duty cycle significantly. This process is sometimes referred to in the art as "upconversion." Once so processed, the N input signals can be interleaved by introducing a fixed delay between successive signals, resulting in a time multiplexed signal of period P/N, with pulse width τ/N, where in period P each of the N input signals has one pulse. This processing increases the bit rate of the multiplexed output signal by a factor of N. Such changes to the input signals are generally achieved by means of creating clocks with the pulse widths of higher speeds but gaps between successive pulses, and modulating (via, e.g., an optical AND function, or the equivalent) the input signals therewith. Such clocks will be referred to herein as "gapped clocks" or "gapclocks." (Because these gapclocks have a pulse width befitting a clock N times their original bit rate, they are also sometimes referred to as high speed clocks, it being understood that due to the gaps, they only have one pulse per the original period P. When N of these gapclock signals are themselves multiplexed, the resulting OTDM signal has a true high speed clock at N times the bit rate of its original component signals).

The multiplexed output signal is created by adding, i.e., superimposing, the appropriately delayed processed input signals. On the receiving side, the multiplexed signal needs to be demultiplexed to regenerate the N individual signals. Once the individual signals are separated, their shortened duty cycles need to be restored. This functionality, often referred to as downconversion, requires duty cycle multiplication. In what follows methods and apparatus for the all optical implementation of upconversion and downconversion, i.e., creation of gapped clocks and duty cycle multiplication are presented.

For ease of illustration, what will be discussed is an exemplary OTDM system with four input signals, all operating at the same clock speed (bit rate). These four input signals are assumed to each have a duty cycle of 50%, i.e., $\tau=P/2$, where $\tau$ is the pulse width and P is the total period, the exemplary system being an NRZ or non-return-to-zero system.

FIG. 1 depicts an exemplary transmit side optical time division multiplexing scheme. There are four input signals, each having the same clock rate. The clock 101 is extracted from one of the input signals, here input signal number four, and then increased by a factor of four to a high speed clock 102. The high speed clock is then fed to each of the input signal lines through a bank of SOA-MZIs 110 with a succession of increasing delays 120 on data lines two, three and four. When combined, these signals result in a multiplexed combination of the four input signals at a data rate which is four times the clock rate of each of the original input signals.

Figure 2:
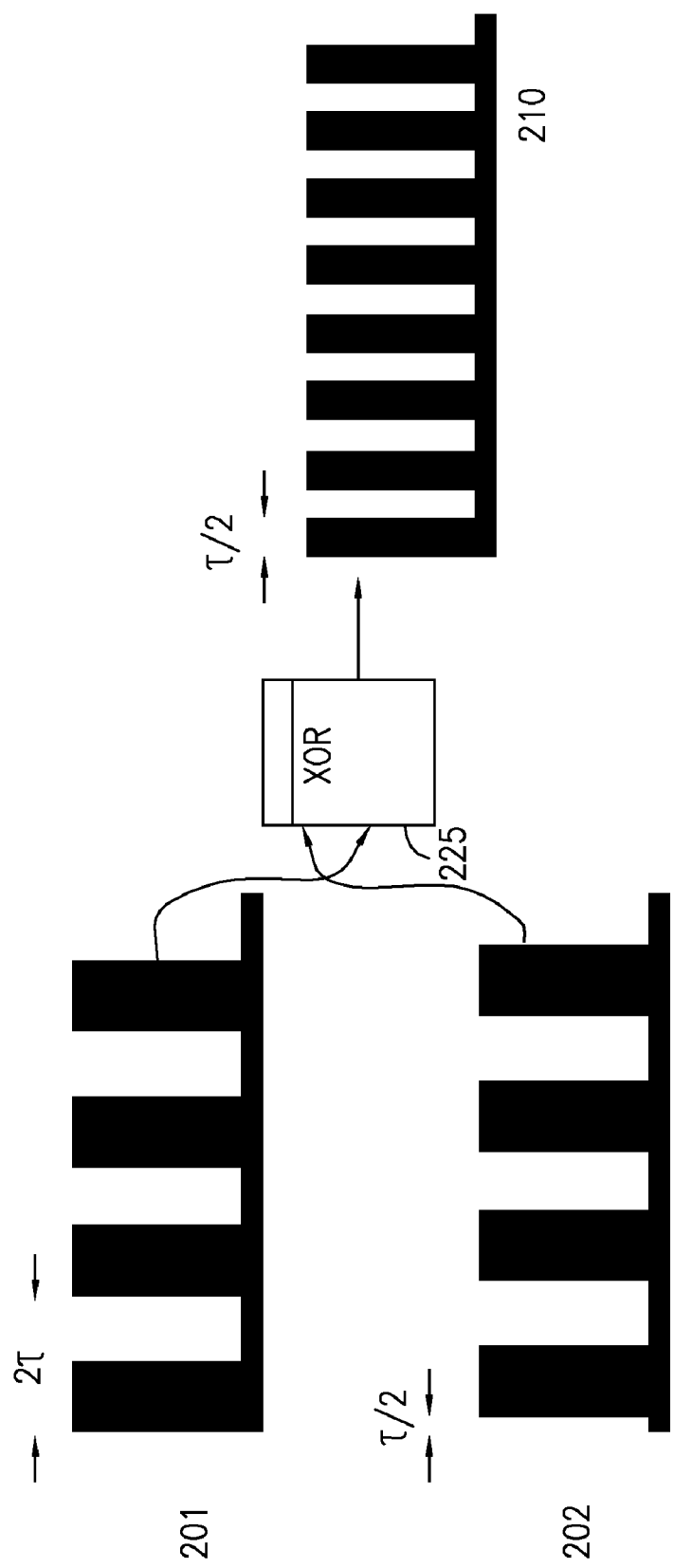
FIG. 2 depicts the process of doubling a clock signal speed.

FIG. 2 depicts the process of optically doubling a clock's speed. In FIG. 2, input clock 201 has period P and pulse width $\tau$, operating at a 50% duty cycle. Clock input 202 is the same clock as 201 yet delayed by half of pulse width or by $\tau/2$. These two clocks are then fed through an optical "XOR" device 225 resulting in the output clock 210 which has pulse with $\tau/2$ and period P/2. This clock output 210, operating at double the rate of the input clock 201, can be subjected to the identical processing through using another optical "XOR" which will result in an output clock which is four times as fast as the original input. Thus, it will have a pulse width $\tau/4$ and a period of P/4 in terms of the original pulse width T and period P.

Figure 3:
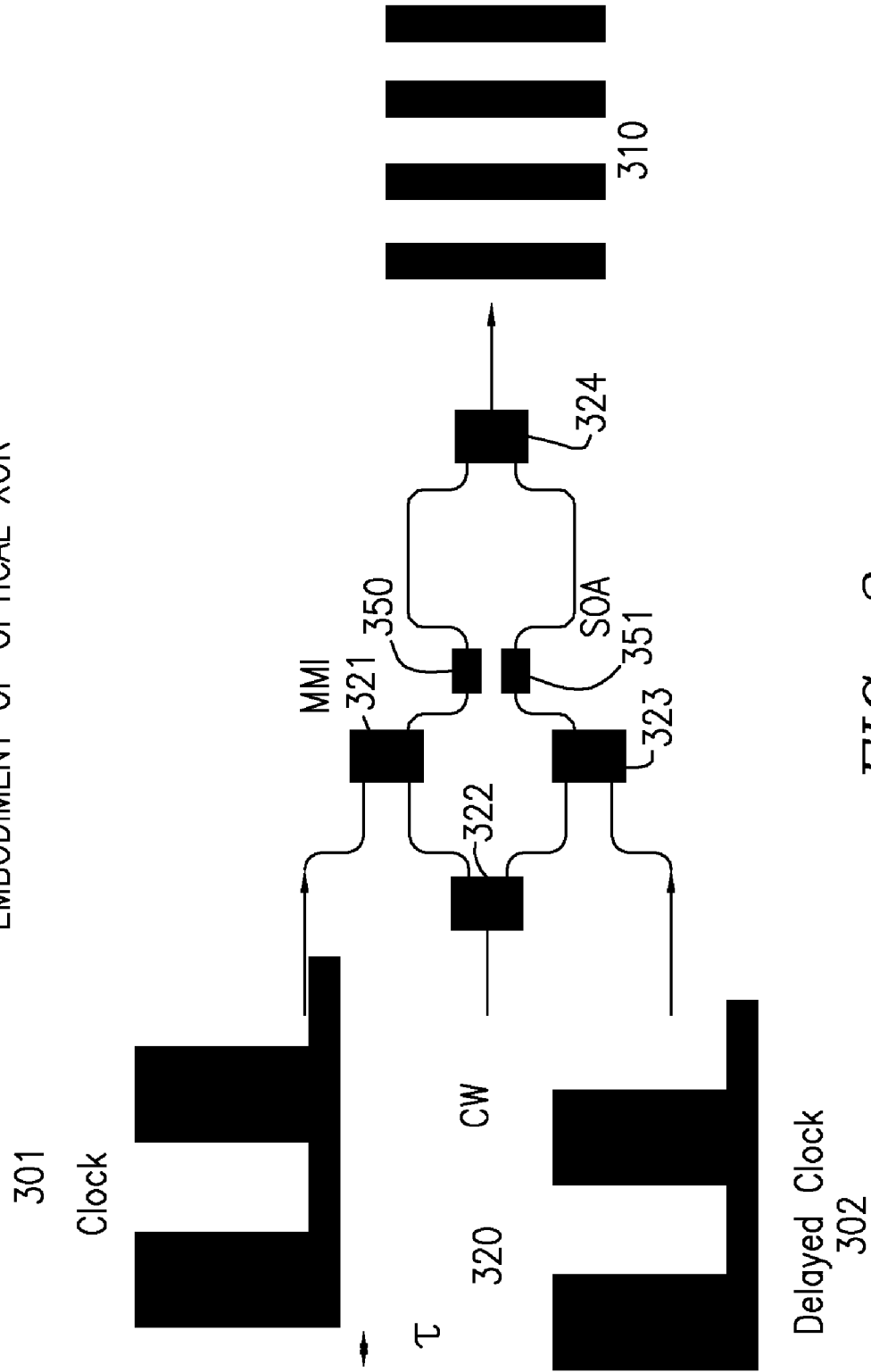
FIG. 3 depicts the identical system as shown in FIG. 2 with an exemplary optical XOR circuit.

FIG. 3 depicts the identical system as shown in FIG. 2 with an exemplary optical circuit for achieving the "XOR" function. The inputs to the optical circuit are the delayed clock 302, the clock 301 and a continuous wavelength light source 320. There are a number of multimode interferometers 321, 322, 323, 324 and two semiconductor optical amplifiers (SOAs) 350 and 351. The semiconductor optical amplifiers 350 and 351 are designed to optimally operate in saturation mode. Additionally, there is a voltage bias applied to one of them, say SOA 351, such that the optical path difference between the two pathways is an odd integer multiple of $\tau\tau$, a situation of destructive interference. Thus, their function is as follows: when both the clock 301 and the delayed clock 302 have pulses that are on, or when both pulses from each of these input signals 301 and 302 are off, the optical difference is unaffected by the clock and delayed clock inputs. The optical path difference therefore remains an odd integer multiple of $\tau\tau$ due to the voltage bias, which sets the pair for destructive interference, so no light passes. When only one pulse is on, either from the clock 301 or the delayed clock 302, the optical path difference between them is now an even integer multiple of $\tau\tau$, a situation of constructive interference, and light goes through. The combination of the two clocks thus acts as a periodic opening and closing of a window of time by means of which the longer duration input pulse is clipped into a shorter duration output pulse (i.e., where signals 301 and 302 have opposite values—one having a pulse the other no pulse—then and only then is there an output pulse; otherwise the output is a logical zero, or no signal). This process results in the output 310 of a doubled clock at the wavelength of the continuous wavelength input 320. There may be some residual signal from the clock 302 and delayed clock 301 in addition to the continuous wavelength CW 320 input, although in comparison to the CW 320 signal they are of considerably lower optical power. Should this residual signal nonetheless be desired to be removed, if the CW input 320 is at a different wavelength than the clock inputs 301 and 302, the signal from the clock inputs can be filtered out by various means as may be known in the art.

Figure 4:
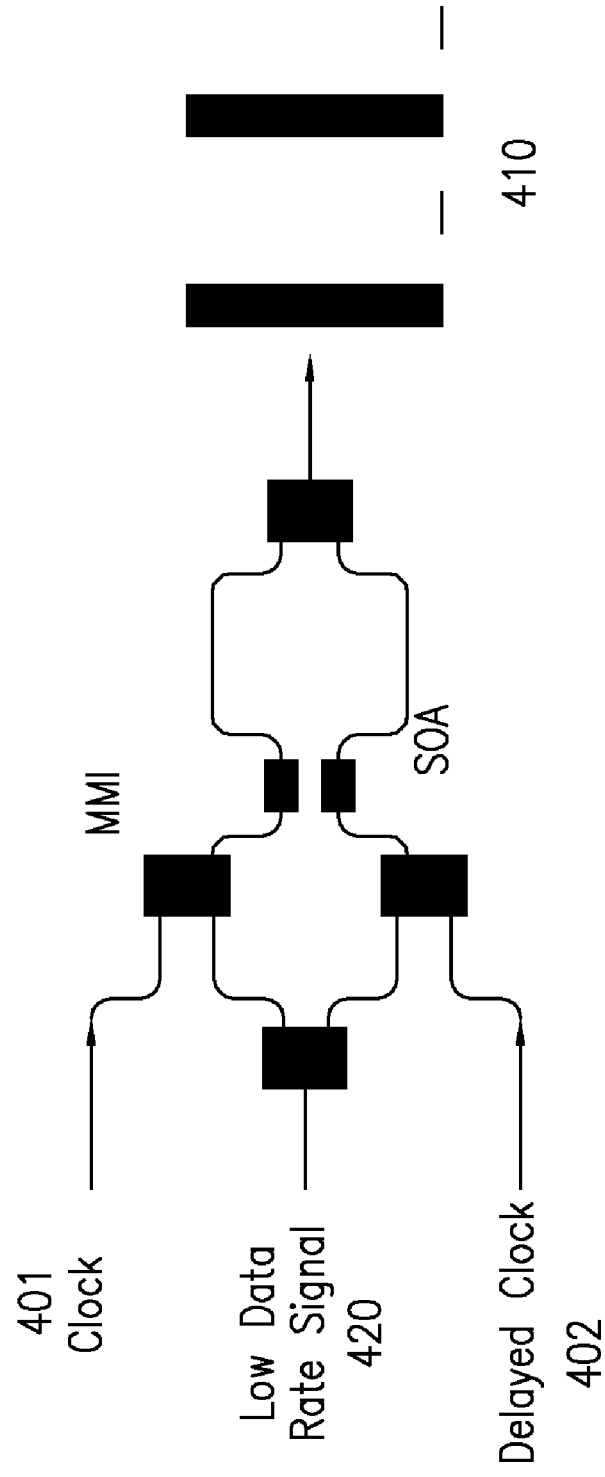
FIG. 4 depicts the system of FIG. 3 where instead of a CW input there is a low data rate input signal.

FIG. 4 depicts the system of FIG. 3 where instead of a continuous wavelength (CW) input there is a low data rate input signal 420. Using the optical "XOR" of FIGS. 3 and 4, the low data rate signal 420 is to be subjected to a periodic opening and closing of a window of time—determined by the clock 401 and the delayed clock 402 inputs—during which the longer duration input data pulses of the low data rate signal 420 are clipped into shorter duration pulses shown by the output 410. Effectively, the low data rate signal is modulated by a sped-up clock (such as output 301 created by the method shown in FIG. 3). It is noted that for this operation to work, the clock, delayed clock and low rate data signal inputs must be related in such a way so that an even number of periods of the effective "clock" created by XOR-ing the clock 401 and delayed clock 402 inputs fit in the pulse width of the low rate data signal. Output 410 is thus a modulating of a low data rate signal at the original clock rate by an effectively doubled clock such as output 310 in FIG. 3. Since a full period of the new "clock" fits into one original pulse width of low rate data signal 420, the output 410 simply catches one half of each of the high and low portions of the input 420. This functionality, albeit somewhat modified, will be used in the receiving side of the OTDM system, as described more fully below.

Figure 5:
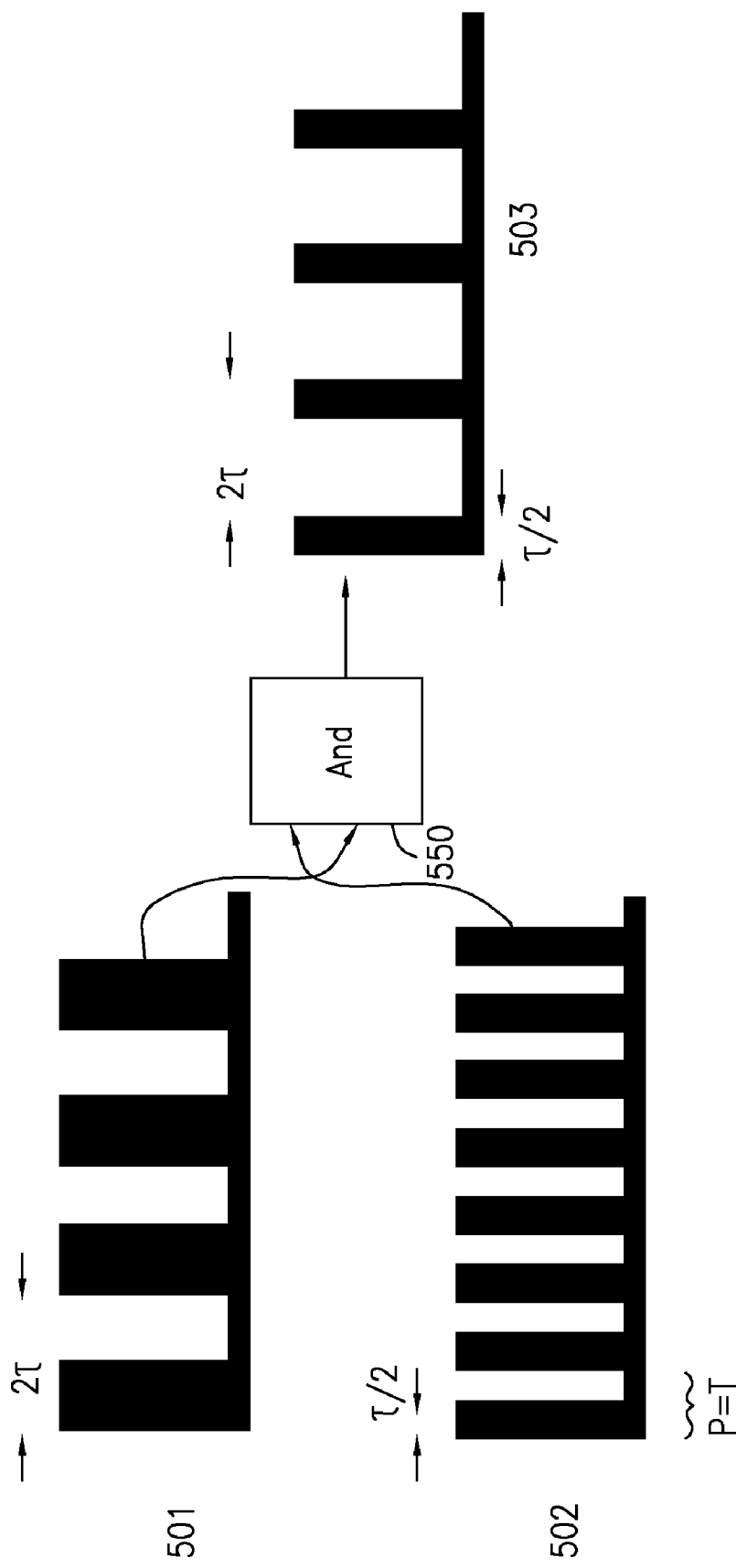
FIG. 5 depicts creation of a gap clock according to the method of the present invention.

Alternatively, as shown in FIG. 5, the doubled clock 502 with a pulse width $\tau/2$ and a period of $\tau$ can be subjected to the optical "AND" function, represented in FIG. 5 by the AND block 550, such doubled clock 502 being AND-ed with a delayed the original clock 501 whose pulse width is $\tau$ and whose period is $2\tau$. This results in an output clock signal 503 with the original clock period $2\tau$ but now having a pulse width of only $\tau/2$.

Figure 6:
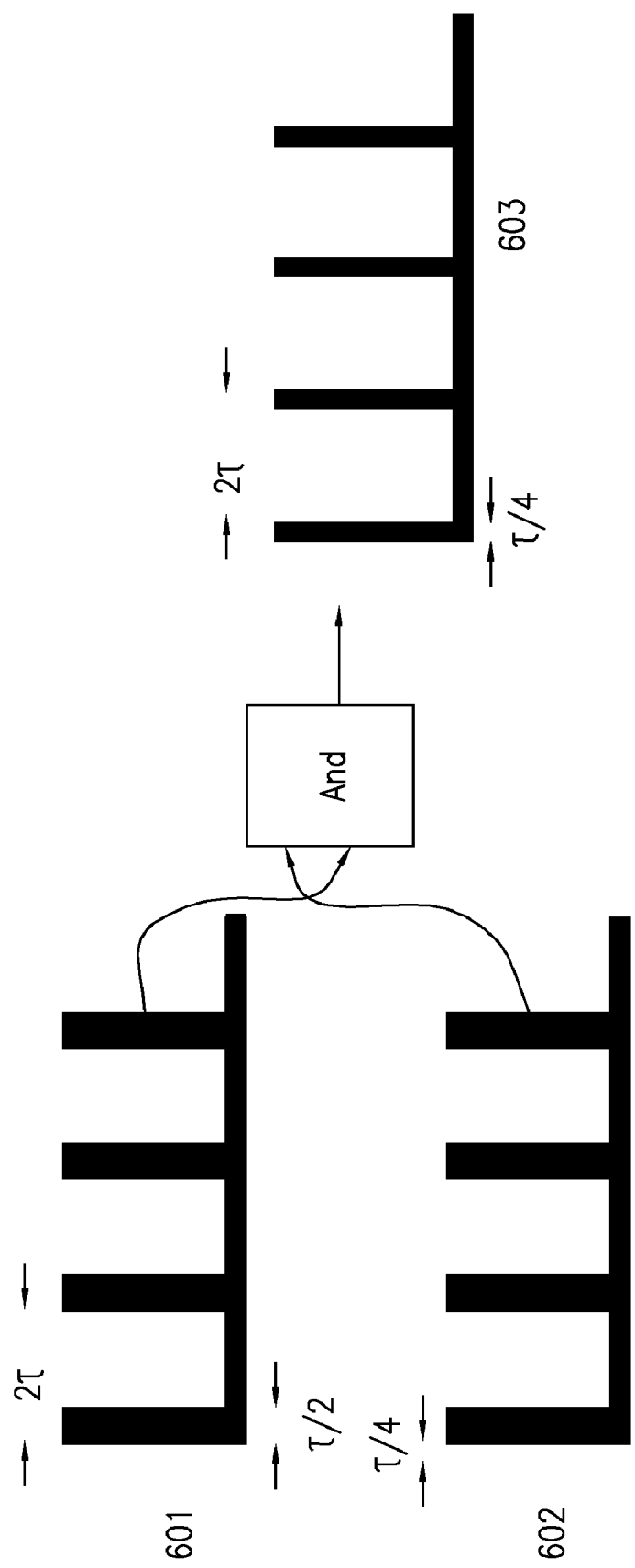
FIG. 6 depicts using the gap clock output of FIG. 5 to create a gap clock with a larger gap.

FIG. 6 depicts further increasing the gap between successive pulses in a gapped clock by taking the output 503 from FIG. 5 and once again AND-ing it with a copy of itself delayed by half a pulse width. With reference to FIG. 6, input 601, which is identical to output 503 from FIG. 5, is optically AND-ed with input 602, which is a copy of itself delayed by half of a pulse width, or in terms of the exemplary original pulse width $\tau$, delayed by $\tau/4$. The result is an output gapclock whose period remains at $2\tau$ but whose pulse width is now $\tau/4$. The pulse width has now been decreased by a factor of 4; thus, in this exemplary OTDM system with N=4, the gapclock has been fully created.

Figure 7:
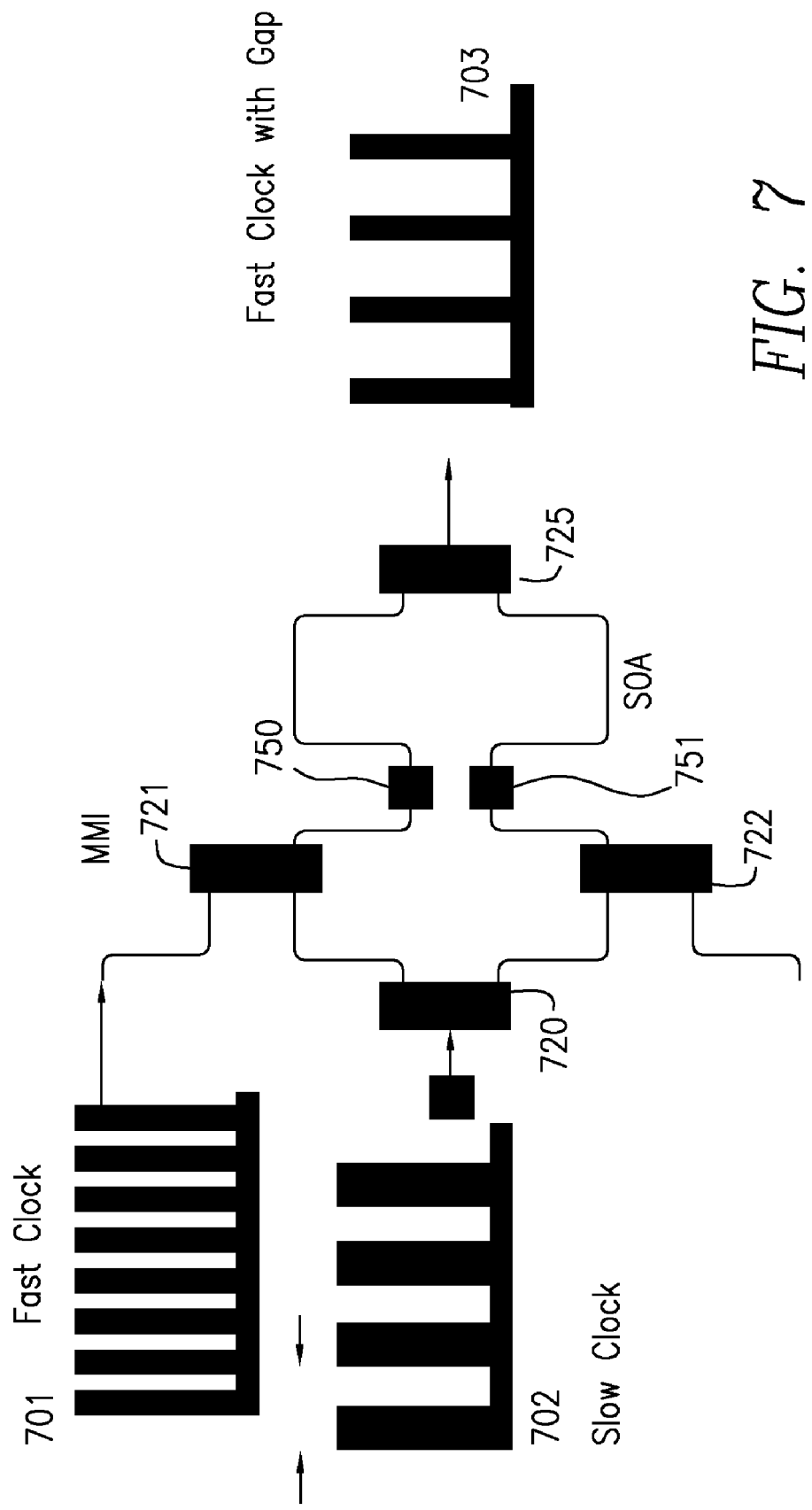
FIG. 7 depicts apparatus for creating a fast clock with a gap from a fast clock and a slow clock input.

FIG. 7 depicts an exemplary implementation of the optical AND function. With reference to FIG. 7, inputs 701, a fast clock, and 702, a slow clock, are respectively fed into the apparatus. The slow clock 702 is fed to MMI 720 whereas the fast clock 701 is input to MMI 721. MMI 722 is redundant to MMI 721 and thus allows various inputs to the circuit to be utilized; thus input 701 could have been input thereto just as well. Input 702, having been fed through the central MMI 720 is split in the output of the MMI into two arms which are recombined at MMI 725, in this embodiment a 2×2 coupler, whose outputs are the circuit outputs. Only one output is shown however. In alternative embodiments, where there is no need or no desire for redundant output from the terminating MMI, this could be a Y-type device which has two inputs and one output. The signal between MMIs 720 and 725 will either combine in constructive or destructive interference depending upon the two SOAs 750 and 751, located in each arm, respectively, of the apparatus. In this exemplary embodiment, SOA 751 is subjected to an external electrical bias, which can be either voltage or current, so as to create a 180 degree phase shift relative to SOA 750. In the absence of a complimentary shift in phase at SOA 750, the two arms of the apparatus will destructively interfere at MMI 725 and there will be no output. However, if SOA 750 undergoes signal induced phase modulation due to the presence of a pulse with sufficient amplitude, then the two arms of the device will be in phase and will constructively interfere, passing a high pulse from input 702 through to the output. The cause of the signal induced phase modulation in SOA 750, as should be obvious from FIG. 7, is the fast clock input 701 passing through MMI 721. Whenever the fast clock input 701 is high, signal induced phase modulation occurs at SOA 750 and constructive interference results. If the input 702 happens to be high for the extent of the signal induced phase modulation at SOA 750, that high input will be passed through. In other words, the fast clock input 701 modulates the slow clock input 702 to the device. Thus, the device of FIG. 7 is implementing the schematic representation depicted in FIG. 5, where the slow clock 702 is equivalent to input 501 and the fast clock 701 is analogous to input 502. As above, the fast clock being the clock input whose clock rate is double that of the slow clock. The output 703 is analogous to output 503 and is in fact a gapped clock. In other words, output 703 preserves the overall period of the slow clock input 702, namely $2\tau$ in the exemplary embodiment, but the pulse width is now $\tau/2$, completely analogous to that shown in FIG. 5 as output 503.

The apparatus of FIG. 7 can be used once again to implement the optical signal processing functionality of FIG. 6, another optical AND function (such functionality is not depicted in FIG. 7, but can be easily conceptualized therefrom). In this case, two signals having the same pulse width and the same period are input to the apparatus, one being input to the center MMI 720; the other being input to either of the single arm MMIs, 721 or 722, respectively. Whichever MMI—i.e., either the top or the bottom, 721 or 722—are used as a signal input, the arm of the apparatus in which that input MMI does not appear, such as e.g., MMI 722 in FIG. 7, has an SOA in its arm which is externally electrically biased to a 180 degree phase difference relative to the SOA in the arm of the apparatus where the input MMI is located, such as e.g., with reference to FIG. 7, MMI 721.

Thus, one input signal effectively modulates the other input signal. It is noted that in order to implement the optical signal processing functionality of FIG. 6, one of the inputs needs to be delayed in time by an amount equal to one half their pulse width so as to result in output 603 (with reference to FIG. 6) which is a gapclock having a period of $2\tau$ and a pulse width of $\tau/4$.

Figure 8:
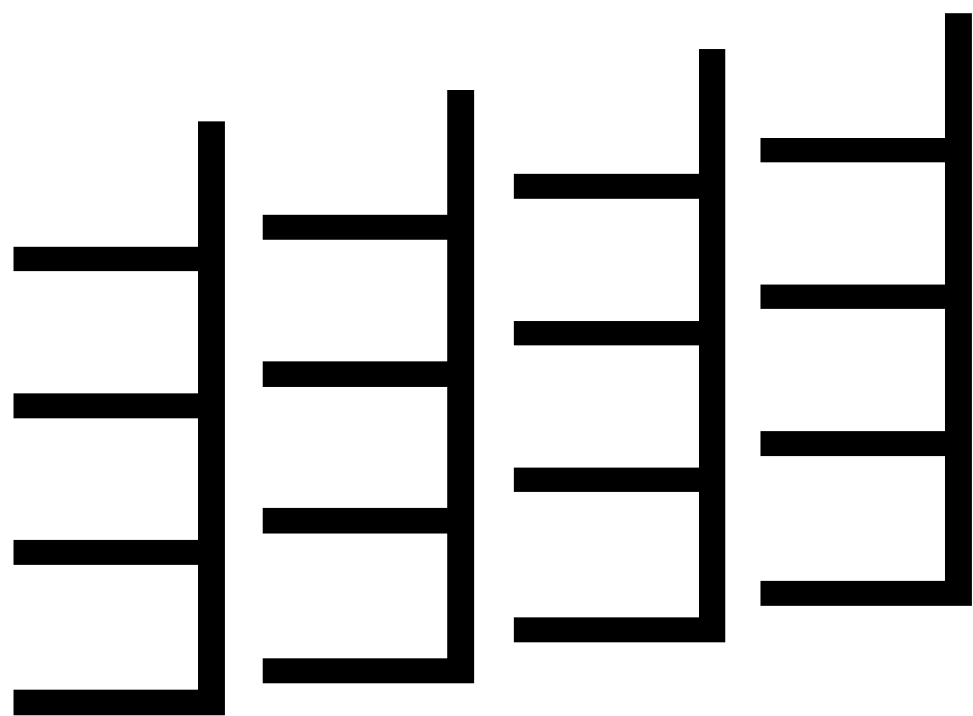
FIG. 8 depicts four gap clocks excessively delayed one from the other.
Figure 9:
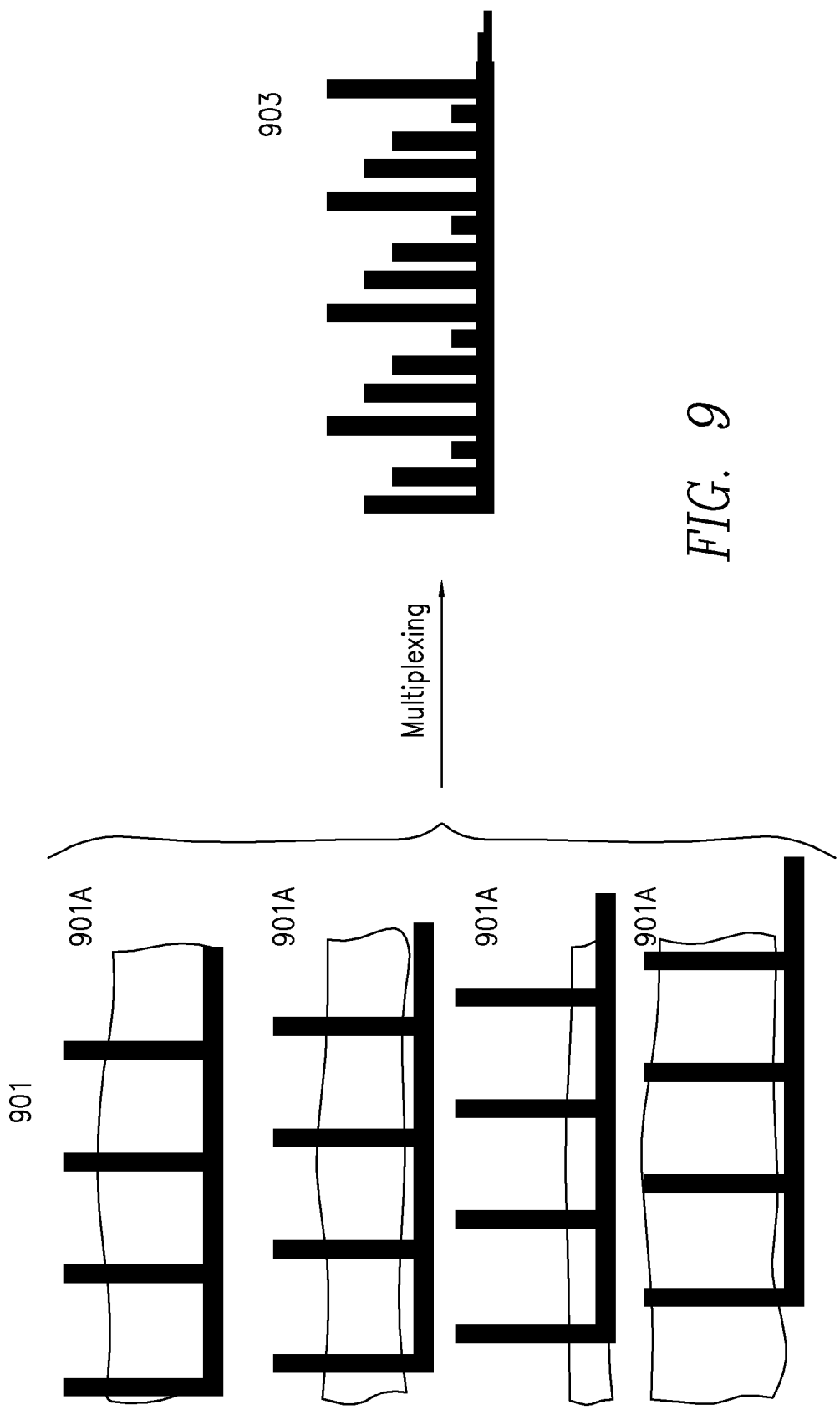
FIG. 9 depicts using the gap clocks of FIG. 8 to generate a multiplexed signal.

FIG. 8 depicts this gapclock in four copies, each delayed relative to the other by an equal amount so as to facilitate each of the four gapclocks capturing a input data signal with a much wider pulse width as is shown in FIG. 9. With reference to FIG. 9, inputs 901 are created by AND-ing each of the four copies of the gapclock of FIG. 8 with a input data signal which has a much wider pulse width; then superimposing these four AND-ed inputs to create the multiplexed output signal 903.

This concludes the transmit side of the OTDM system according to the present invention. As can be seen with reference to FIG. 9, output signal 903 is composed of four time division multiplexed input signals, where each of said input signals has an identical pulse amplitude. (For purposes of illustration and distinguishing one from the other, they are depicted with varying amplitudes relative to each other). Each of these input signals corresponds to one of the wide input signals 901A on the input side of FIG. 9.

The remaining drawings depict necessary functionalities on the receive side of the OTDM system for demultiplexing and downconverting the multiplexed signal, as will be next described.

Figure 10:
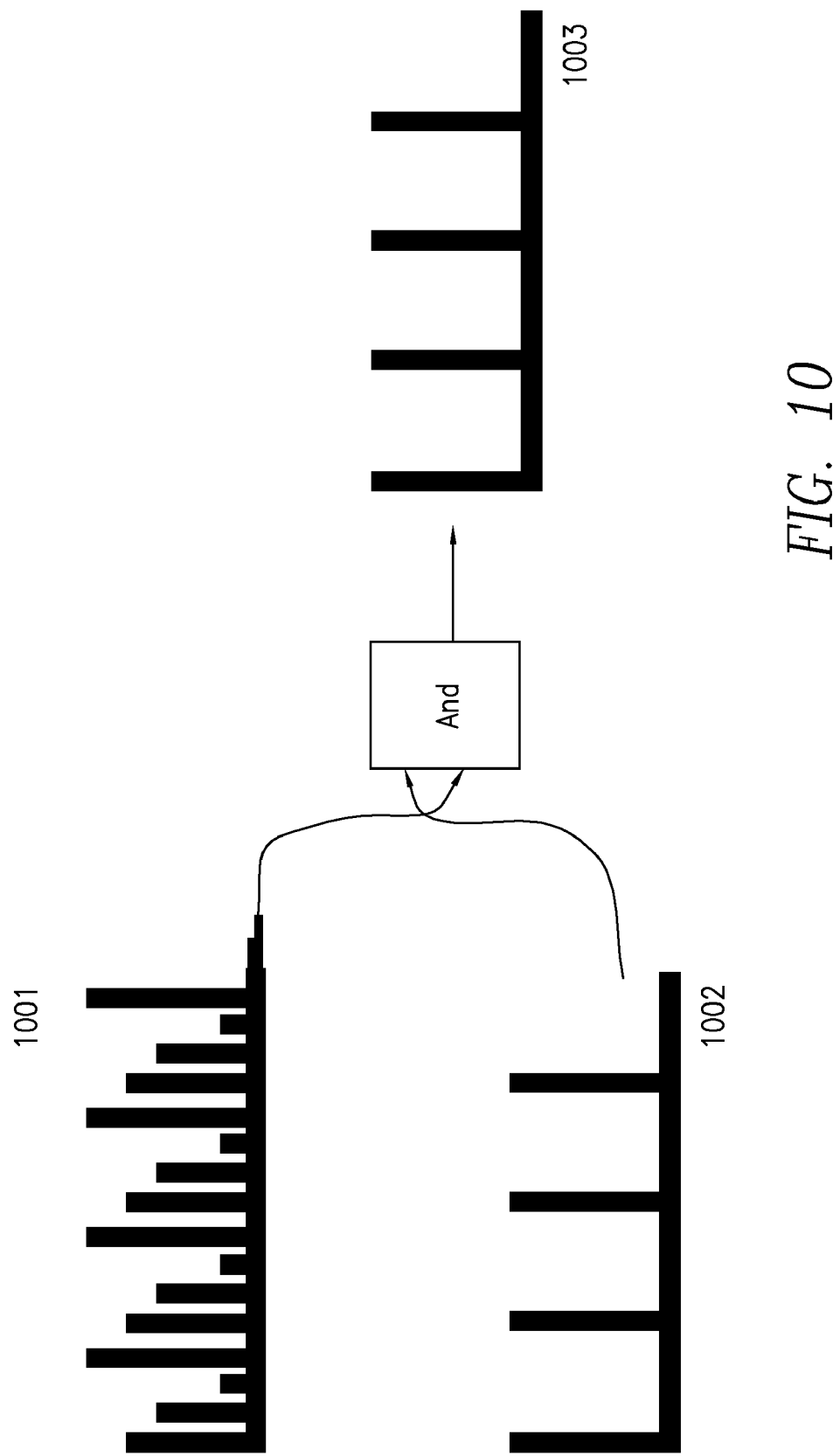
FIG. 10 depicts demultiplexing process according to the present invention.

With reference to FIG. 10, the input signal 1001, which is identical to output signal 903 in FIG. 9, is AND-ed with the same gapclock shown as output 603 in FIG. 6, and four copies of which are shown in FIG. 8 successively delayed one from the other. The demultiplexing of the OTDM signal 1001 is a simple one. The OTDM signal 1001 is subjected to the optical AND function with each of the clocks depicted in FIG. 8 so as to extract its four time division multiplexed components. To operate properly the gapped clocks which are used to AND with input signal 1001 should be synchronized with the gapped clocks as shown in FIG. 8, which were used, as shown in FIG. 9, to capture the four wider pulse input signals 901A.

Figure 11:
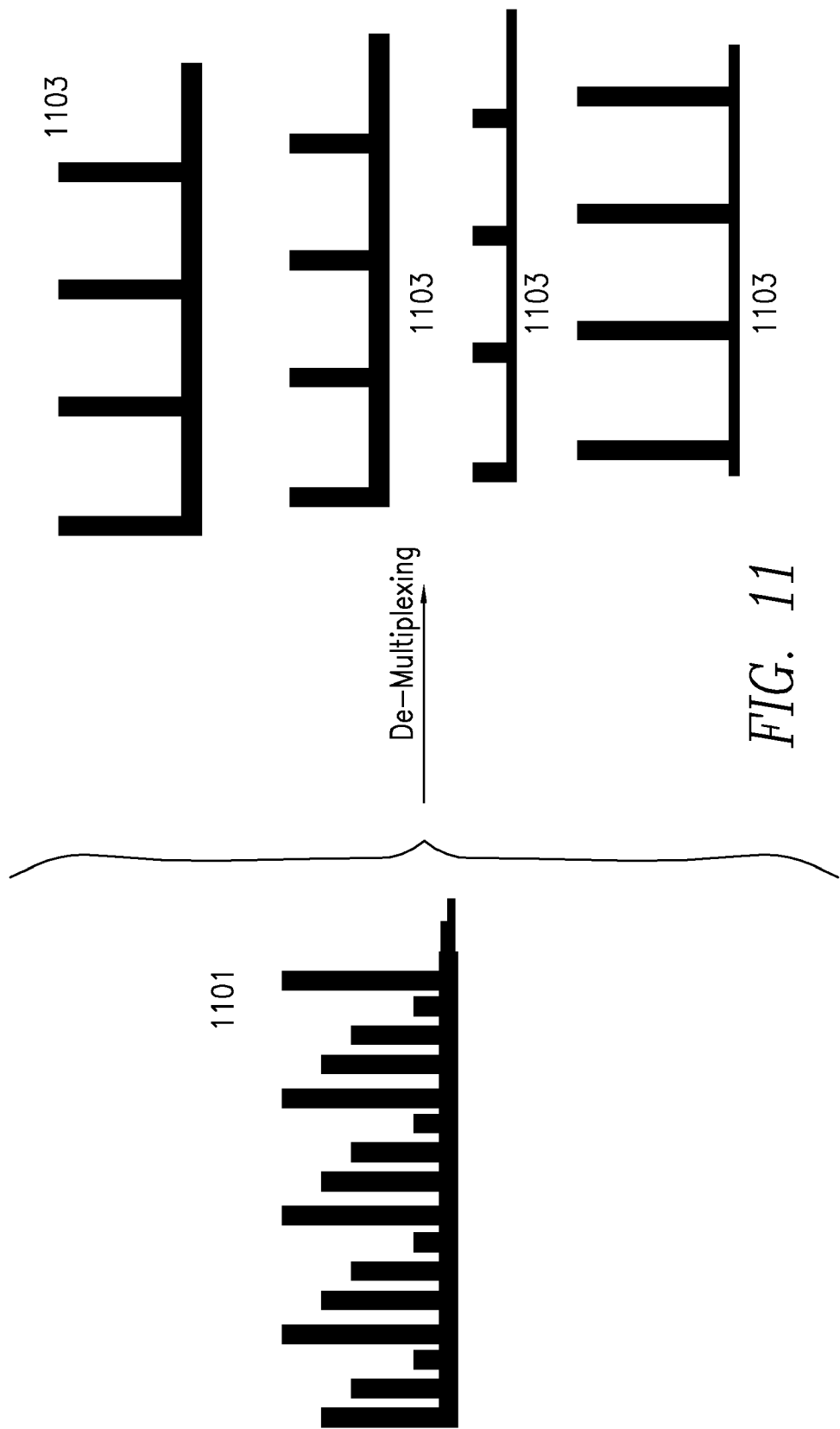
FIG. 11 depicts the overall demultiplexing of the OTDM signal into component signals at the gap clock pulse widths.

Once again with reference to FIG. 10, signal 1001 is AND-ed using gapped clock 1002 to extract component signal 1003. This process is repeated four times to generate the four outputs 1103 shown in FIG. 11. If the clock signal operands to the AND function (1002 with reference to FIG. 10) are properly synchronized, the four input data signals multiplexed in output 903 (in FIG. 9) will be perfectly extracted as outputs 1103 in FIG. 11. Even if not perfectly synchronized, the system will operate if the jitter is small in comparison with the pulse width $\tau/N$, such that most of the pulse width will be extracted.

Figure 12:
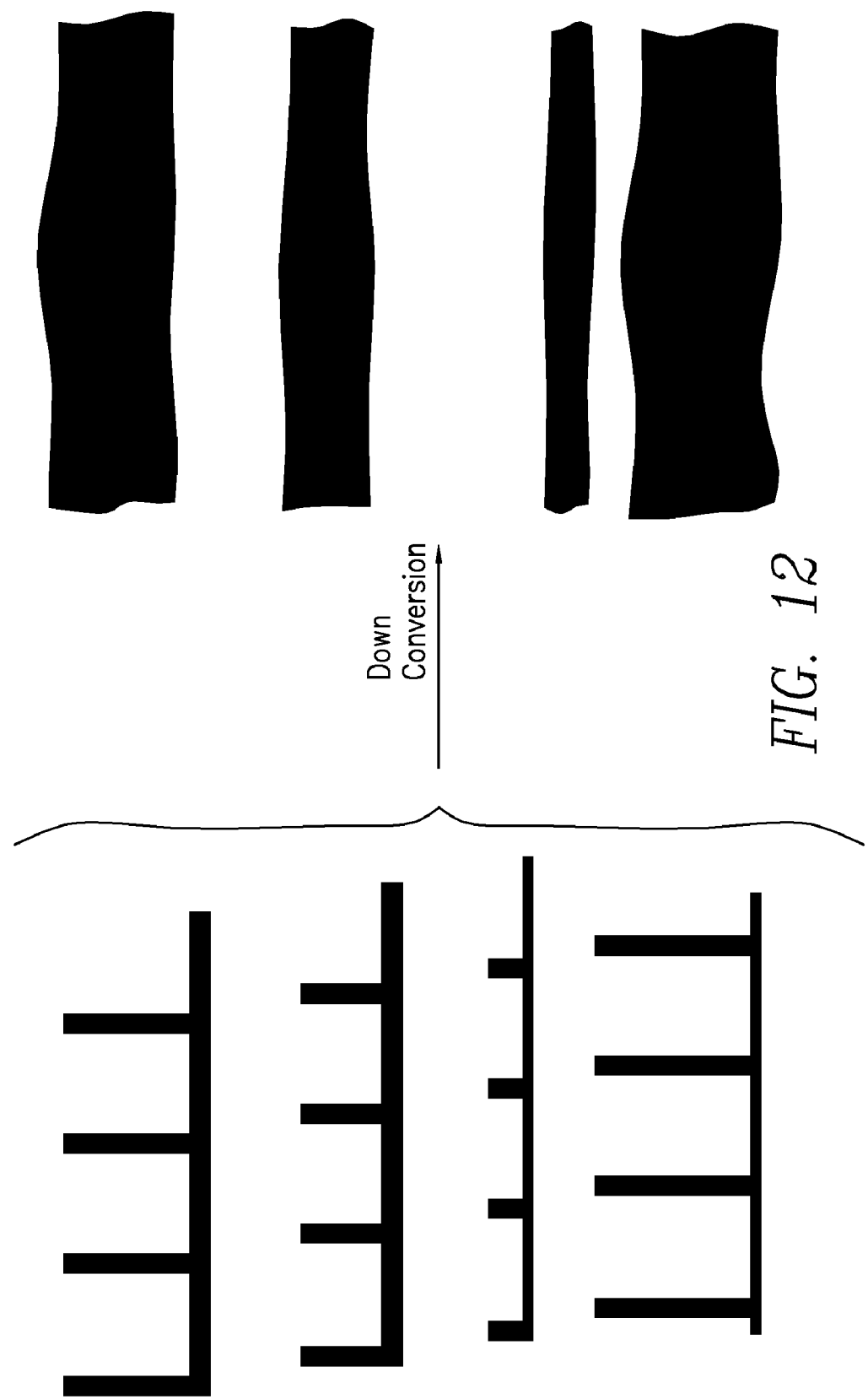
FIG. 12 depicts the general necessity to down convert the separated demultiplexed component signals of FIG. 11 into once again into signals with their original pulse widths.

What remains is to convert the signals 1103 to their original pulse width, thus removing the gap, or downconverting. FIG. 12 schematically shows this downconversion process where a demultiplexed signal of narrow pulse width is transformed to one with a much wider pulse width. This process will next be illustrated with reference to FIGS. 13 through 15.

Figure 13:
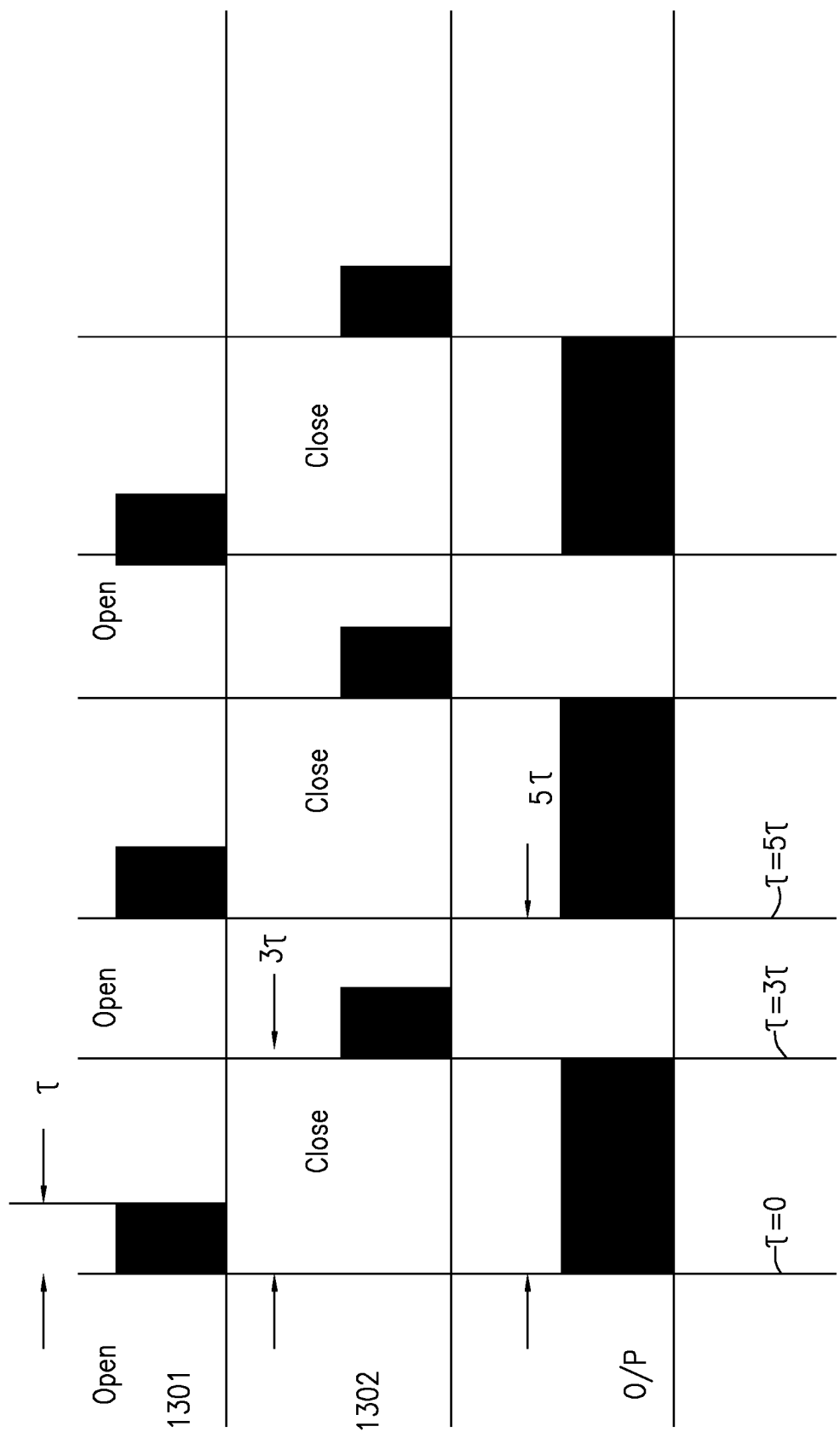
FIG. 13 graphically depicts the process for down conversion.
Figure 14:
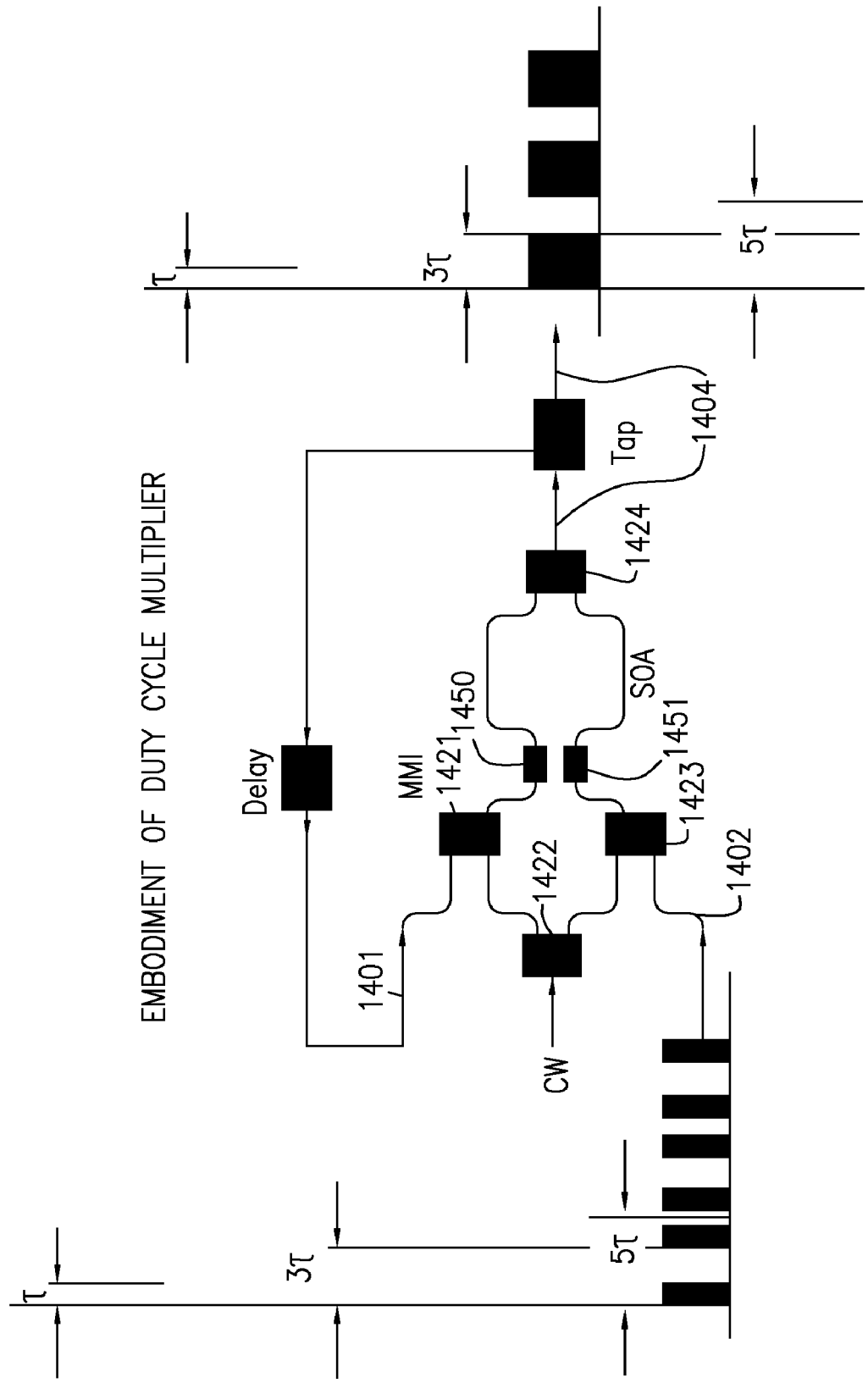
FIG. 14 depicts apparatus to implement the down conversion steps of FIG. 13.

FIGS. 13 through 15 depict various aspects of duty cycle multiplication ("DCM"). The functionality of DCM involves "widening" of a signal's pulse width such that the nonzero portion of an NRZ signal occupies a higher proportion of the overall period. This is also known as increasing the duty cycle. Within the context of the present invention, where the original duty cycle has been decreased by a factor of N (where N refers to the number of components of the ultimate multiplexed output signal at the transmitting side) the natural desideratum is to multiply each demultiplexed component on the receiving side by a factor of N.

FIG. 13 illustrates generally the process for widening a pulse width. With reference to FIG. 13, there are three depicted signals: 1301 on the top row, 1302 on the middle row, and 1303 on the bottom row. The top and middle row signals are used to open and close, respectively, the output signal 1303. Thus, any signal can be made as wide as desired simply by opening at a particular time t=0 and closing at some other time t=T. With reference to FIG. 13, at t=0 the top row signal 1301 goes high, thereby opening or beginning the output signal 1303. The output signal 1303 remains high until the closing signal 1032 goes high. With reference to the example depicted in FIG. 13, the closing time is at T=3τ. Once it goes high, the output pulse goes low and thus the pulse width of the output pulse 1303 is determined. It is noted that the relative widths of the pulses 1301 and 1303 with reference to FIG. 13 are arbitrary and do not relate specifically to the example described above where there was a four component multiplexing scheme and therefore, N was equal to 4. Obviously, in that exemplary embodiment the closing pulse would be initiated at a time T=4τ such that a demultiplexed data signal whose pulse width had been reduced from τ to τ/4 could be reconstituted at a pulse width of T. In terms of duty cycle multiplication, or DCM, the original data signal had a 50% duty cycle as its pulse width was τ and its period 2τ. In order to transmit that component signal on a four signal OTDM scheme, the pulse width was reduced by a factor of N=4 for a pulse width of τ/4 or overall duty cycle of 12.5%. The DCM of FIGS. 13 through 15 would then be used on the receiving side to reconstitute that exemplary component signal and multiply its duty cycle from 12.5% back to 50%.

FIG. 14 depicts the apparatus utilized to implement DCM, or using different words to describe the same thing, pulse width widening. FIG. 14 is a modified version of the apparatus of FIGS. 3 and 7. As will be recalled, FIG. 3 was the apparatus for implementing an optical XOR function, and FIG. 7 that for implementing the optical AND function. FIG. 14 is essentially implementing the XOR function; the upper input 1301 is XORed with the lower input 1302 and the result of the XOR of inputs 1301 and 1302 modulates a continuous wavelength Input signal 1303 to produce the output 1304 with the duty cycle multiplied.

It is noted that arbitrary numbers have been used for the period and timing of opening and closing pulses in the example depicted in FIGS. 13 through 15. This is because it is desired to be explicitly shown that the upconverted pulse width and the overall period, do not have to be related by powers of two. In this case, the incoming pulse width is τ; the upconverted pulse width is 3τ and the overall period is 5τ. Thus, there is a duty cycle inherent in this exemplary system of signals of 3 divided by 5, or 60%. The incoming pulse, as well as the closing pulse which is inserted into the input pulse stream 1302, are analogous to those shown in FIG. 13. The opening pulse 1301 is simply the incoming downconverted pulse 1301 of width τ; the closing pulse is one that is of the same width τ but inserted in the third bit position 1302, which has the same pulse width τ as does the opening pulse; and the output pulse is a pulse beginning at the same time as the opening pulse and ending at the beginning of the closing pulse.

In other words, it begins at a time t=0 and ends at a time t=3τ. As can be seen, the next opening pulse does not come until a time where t=5τ, thus, the overall period is 5τ.

In order to utilize the duty cycle multiplier of FIG. 14 for the exemplary OTDM system described above where N=4, the timing of the pulses on input line 1302 to the apparatus would be somewhat different.

FIG. 15 shows the transformation of the input line 1302 (analogous to the column entitled "short pulse" in FIG. 15), which is XOR-ed with the delay line 1301 (analogous to the column labeled feedback in FIG. 15). The XOR in short pulse line 1302 XOR-ed with the feedback line 1301 results in an output 1304 corresponding to the column labeled "output" in FIG. 15. In effect, the short pulse input signal bit pattern "10010" is being transformed to the output bit pattern "11100" and that pattern repeats four times in FIG. 15. With respect to FIG. 14, the way that this operates is as follows.

FIG. 14 is the XOR apparatus of FIG. 3 where the input to the upper arm 1401 is a delayed feedback of the output 1404. The first input pulse on input line 1402 sees nothing on the feedback line 1401. This is because the feedback line is simply the output delayed by one of the incoming pulse widths, τ. Because the input signal 1402 is a 1 and the feedback signal 1401 is a 0, the XOR of these two signals results in a 1 as the first output bit. The second bit on the input line is a 0, but since the output of the first bit was a 1, the second feedback bit is a 1. XOR of signals 1401 and 1402 produces a 1 on the output second bit. The third bit on the input line 1402 is another 0 but since the output of the second bit was a 1, now the feedback line 1401 has a 1 for the third bit which is XOR-ed with input line 1402 resulting in a 1 as the third output bit. The fourth bit comprises the closing pulse (the first pulse appearing in row 1302 with respect to FIG. 13) and the feedback in the fourth bit space being a 1, the XOR of those two 1 s is a zero. Finally, in the fifth bit place the input line has a 0, the delay line has a 0—merely the delayed output of the fourth bit—and the XOR of those two is 0 as well. This transforms the input pulse train of "10010" to the output pulse train of "11100."

As described above, the way the XOR function is implemented optically is by modulating the phase difference between the upper and lower arms of the interferometer. As described above with reference to FIG. 3, the pair of semiconductor optical amplifiers 1450 and 1451 are externally biased so as to have 180 degree phase difference between them. Thus, when they both have a 0 propagating through them or they both have a 1 propagating through them the phase difference remains between these SOAs and they destructively interfere resulting in a 0 output. When one of them has a 1 and the other has a 0, signal induced phase modulation results and the phase difference between them becomes 0 in which case they cause constructive interference and an output of 1.

In order to adapt the device of FIG. 14 to the example OTDM system described above, all that needs to be done is to vary the input pulse train 1402 to reflect the narrowed pulse width τ/4 and the overall period 2τ. Thus, the opening pulse on input line 1402 would be the actual demultiplexed component data signal. A copy of that first bit would need to be inserted as the closing bit exactly four bits later. This would result in the input bit stream 1402 of "10001000" being transformed to an output bit stream of "11110000." The manner of inserting the copy of the signal in the fifth bit position is a simple one. The input pulse in the first bit position would be copied; one copy being sent along input line 1402, the other copy being subjected to a delay of 4t (where t is equal to the pulse width of the first bit pulse—τ/4 in the example OTDM system discussed hereinabove) and then returned to input line 1402. This converts the demultiplexed component data signal from a bit pattern of "10000000" to one of "10001000", fully downconverting the demultiplexed component signal and reconstituting the original data signal at the receiving side. The inserted delayed bit is implemented by copying an input bit pulse by methods known in the art and delaying it, or by simply splitting the demultiplexed component data signal in a 3-dB coupler and sending one half to directly to the input to MMI 1423 and the other half through a delay element of 4t and then returning it to input line 1402. Other methods as are known or as may be known in the art may be used as well.

While the above describes the preferred embodiments of the invention, various modifications or additions will be apparent to those of skill in the art. Such modifications and additions are intended to be covered by the following claims.

What is claimed:

1. A method of combining N input NRZ optical data signals, each having an equal bit period and duty cycle, into one time-division multiplexed output signal, comprising:
   providing N synchronized input NRZ signals;
   shortening the pulse width of each input signal by reducing the duty cycle by a factor of 1/N while keeping the bit period the same;
   delaying said shortened input signals one from another by a fixed delay such that all N signals occur within one said bit period; and
   combining said delayed N shortened signals to form one multiplexed output signal,
   wherein N is an integer greater than 1 and is equal to the number of signals being combined; and wherein said shortening of the pulse width while keeping the bit period the same comprises: AND-ing the input signal with a gap clock signal, where said gap clock signal has a pulse width equal to 1/N of the bit period of the input signal, and a bit period equal to that of the input signal.

2. A method of transforming a clock signal into a gap clock signal, where the gap clock signal has a pulse width of 1/N that of the clock signal and an overall bit period equal to that of the clock signal, where N is an even number, comprising:

a. XOR-ing the clock signal with a copy of the clock signal delayed by half of a pulse width to create a first intermediate signal;

b. AND-ing the first intermediate signal with the clock signal to create a second intermediate signal;

c. AND-ing the second intermediate signal with a copy of itself delayed by one half of its pulse width to create an output signal; and repeating step (c) on its output signal until the clock signal's pulse width has been reduced by a factor of N.

3. A method of combining N input NRZ optical data signals, each having an approximately equal pulse width and period P, into one time-division multiplexed output signal, comprising:

providing N synchronized input NRZ signals, wherein N is an integer greater than 1 and is equal of the number of signals being combined;

shortening the pulse width of each input signal by a factor of 1/N while keeping the bit period the same;

introducing delays between successive ones of the input signals such that each period P includes one pulse from each of the input signals; and interleaving the input signals to form one multiplexed output signal, wherein the step of shortening of the pulse width while keeping the bit period the same comprises: AND-ing the input signal with a gap clock signal, where said gap clock signal has a pulse width equal to 1/N of the bit period of the input signal, and a bit period equal to that of the input signal.

* * * * *